United States Patent [19]

Smirl

[11] 4,241,618
[45] Dec. 30, 1980

[54] VARIABLE PULLEY TRANSMISSION

[75] Inventor: Richard L. Smirl, Arlington Heights, Ill.

[73] Assignee: Borg-Warner Corporation, Chicago, Ill.

[21] Appl. No.: 16,862

[22] Filed: Mar. 2, 1979

[51] Int. Cl.³ .............................................. F16H 55/52
[52] U.S. Cl. ...................................... 74/863; 74/695; 74/700; 74/740; 474/12; 474/18; 474/46
[58] Field of Search ............... 74/230.17 A, 230.17 F, 74/230.17 M, 230.17 E

[56] References Cited

U.S. PATENT DOCUMENTS

| 2,387,609 | 10/1945 | Reeves | 74/230.17 A |
|---|---|---|---|
| 2,932,216 | 4/1960 | Schou | 74/689 |
| 3,043,152 | 7/1962 | Karig et al. | 74/230.17 F |
| 3,115,049 | 12/1963 | Moan | 74/230.17 F |
| 3,599,504 | 8/1971 | Taylor | 74/230.17 E |
| 3,638,744 | 2/1972 | Washizawa | 74/230.17 E X |
| 3,863,514 | 2/1975 | Jensen | 74/230.17 A |
| 4,048,864 | 9/1977 | Ritter | 74/230.17 F |

*Primary Examiner*—H. Hampton Hunter
*Attorney, Agent, or Firm*—Aubrey L. Burgess

[57] ABSTRACT

A power transmission adapted to be connected between a prime mover and a driven means which comprises a variable pulley drive comprising drive and driven pulleys connected by a belt, each having at least one flange axially movable with respect to the other. The pulleys continuously rotate when the prime mover is operational. The output of the prime mover is directly connected to the pulley drive. The prime mover may be an automobile engine, the driven means may include the wheels of an automobile. A speed-responsive friction starting device with means to shift between neutral, forward and reverse is connected between the driven pulley and the driven means. Shifting of a dry, i.e, non-lubricated, belt on the pulleys when the speed ratio is changing is enhanced because of the continuous driving of the pulleys. Also, because the direction of the rotation of the pulleys is always the same, shifting between forward and reverse is enhanced, this being true for any type of belt. The drive ratio between the pulleys is controlled by a hydraulic control arrangement which is both engine speed and torque responsive and the drive to the vehicle wheels may be through a synchronizer or a planetary gear arrangement to a differential.

12 Claims, 17 Drawing Figures

FIG-15

VARIABLE PULLEY TRANSMISSION

BACKGROUND OF THE INVENTION

The prior art is replete with examples of power transmissions using variable pulley devices comprising a pair of pulleys connected by a belt. The generally accepted variable pulley transmission for automobile use has a clutch and a forward-reverse-neutral mechanism between the prime mover and the transmission. The rate at which the belt can be shifted diminishes as the pulley speed decreases, and in the usual arrangement when the starting mechanism is located between the motor and the drive pulley, the pulley speed decreases rapidly to zero when the vehicle is brought to a stop. It is desirable to maintain the belt in high ratio over a wide range and steady state vehicle speeds, but if a sudden stop is made from say 20 MPH, it is difficult to return the belt to the starting or low ratio before the pulleys stop rotating. With the usual arrangement, a compromise is made to maintain the belt in lower ratios below about 25 MPH, which adversely affects fuel economy. Also, with the usual arrangement, it is necessary to bring the vehicle and pulleys to a complete stop before engaging reverse gear which reverses the direction of rotation of the pulleys; in such case, it is difficult to rock the vehicle out of snow or mud.

THE INVENTION

The apparatus according to this invention comprises a variable pulley drive connected between a prime mover and a driven means. Each pulley has at least one axially movable flange, the spacing between the flanges determining the speed ratio therebetween, the drive between the pulleys being by a flexible belt. Such belts are known in the art and may be constructed of an elastomer with tension members such as cords of metal, fiberglass and the like or of connected metal sections. The apparatus is suitable for automotive uses, the prime mover being the automotive engine and the driven means being a differential and ultimately to either the front or rear wheels of the vehicle.

In the invention described herein, the driver pulley is connected to the drive shaft, so that the pulleys are continuously rotated when the engine is running; starting of the vehicle can be accomplished by a speed-responsive friction starting device, such as a clutch, either automatic or manual, a brake band or disc packs on a reaction member and the like. The starting device will also generally include a forward-reverse-neutral selector mechanism. Starting devices of the type noted and directional selector mechanisms are well known in the art.

One of the main objectives of this invention is to continuously rotate the pulleys during motor operation so that shifting the belt between ratios can be easily accomplished, especially when the vehicle is brought to a rapid stop from a moderate speed and the belt must be returned to the starting or low ratio from a high ratio.

A second objective accomplished by this invention is to permit the pulleys to continuously rotate in the same direction as the prime mover during forward to reverse shifts, so that the inertia of these parts do not have to be synchronized.

There is also provided a hydraulic control system for the pulley assemblies which is both engine speed and engine torque responsive.

The final drive arrangement is controlled by an automatic starting clutch through a forward-reverse mechanism, such as a gear set. The axially movable driveR flange is preloaded with a disc spring and finger structure which connects the rim of the movable flange to a hydraulic cylinder to carry torque between the flange and the cylinder. The hydraulic piston of the cylinder is fed with hydraulic pressure by a follow-up valve controlled by a shift spool or plunger.

The three devices, i.e., the hydraulic cylinder, the follow-up valve, and the shift spool control the axial position of the movable driveR flange and thereby the drive ratio of the transmission.

The driveN assembly comprises a disc spring with fingers which preloads the axially movable flange of the driveN pulley and which, together with a fluid or hydraulic pressure, maintains the movable flange against the belt, so that the pulley carries the torque. The spring and fingers connect the movable flange to a driveN shaft, i.e., the shaft for the final drive assembly for driving the wheels of the vehicle. The hydraulic pressure and the load of the spring control the flange loading of the driveN assembly and thus control the torque capacity thereof.

Another of the objectives of this invention is to control the flange loading on the driveN pulley in such a manner that it closely matches the torque requirements of the belt connecting the driveR and the driveN pulleys in the various drive positions and at the various input torque levels of the engine. The variation in flange loading with respect to flange position or belt ratio is controlled by the shape of the load deflection curve of disc spring, such that when the belt is in the low ratio position, a relatively high spring load is exerted, and as the belt moves to the high drive ratio position, the load diminishes in a pronounced manner. In the preferred embodiment of this invention, the spring load in the high drive ratio position is less than half of the spring load in the low drive ratio position. The change in load with reference to input or engine torque is accomplished on the driveN pulley by variations in the hydraulic pressure applied to the piston connected to the movable flange of the driveN pulley. The combined force of the spring and the hydraulic pressure give a family of curves for each torque level of the drive.

SUMMARY OF THE INVENTION

A power transmission apparatus constructed in accordance with this invention is effective to transmit rotary motion between an engine output shaft and some driven means, such as the driving wheels of a vehicle. The apparatus includes a variable rotary pulley driving unit, having a driver pulley and a driven pulley interconnected by a suitable belt. Each pulley has a pair of flanges, of which at least one is axially movable with respect to the other flange to change the spacing between the flanges of a single pulley. The flange walls are tapered so that changes in the flange spacing in each pulley can effect a corresponding change in the speed ratio between the driver and driven pulleys. Means is provided to operate, responsive at least to the speed of the engine output shaft, to change the spacing of the pulley flanges and thus correspondingly modify the speed ratio.

Particularly in accordance with the present invention, the engine shaft is connected to the driver pulley so that the pulleys are continuously rotated only in one direction whenever the motor is operating. Such pulley rotation enhances the shifting movement of the belt on the pulley flanges as the speed ratio between the pulleys is changed. A speed-responsive friction starting device is provided, to effect a driving connection between the driven pulley and the driven means. A selection means is incorporated to select the direction of rotation of the driven means. Such selection means may comprise a forward-reverse-neutral shifting assembly.

DETAILED DESCRIPTION

Figure 1:
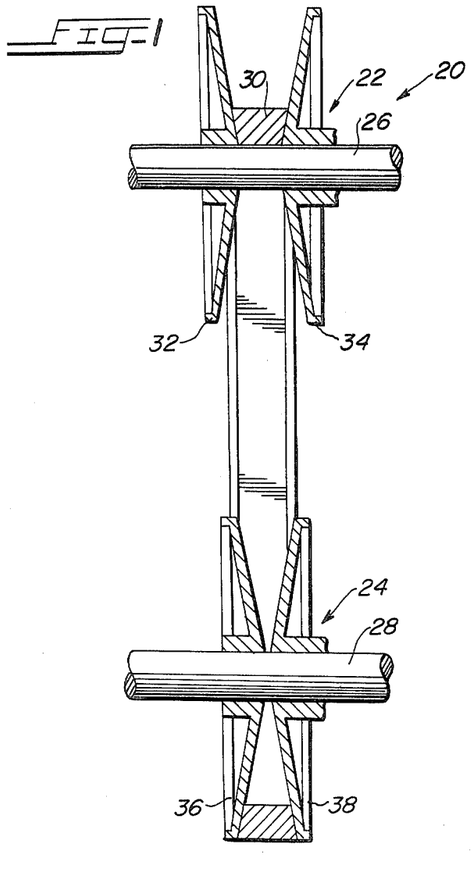
FIG. 1 is a schematic of a variable pulley drive in a low drive or idle condition.
Figure 2:
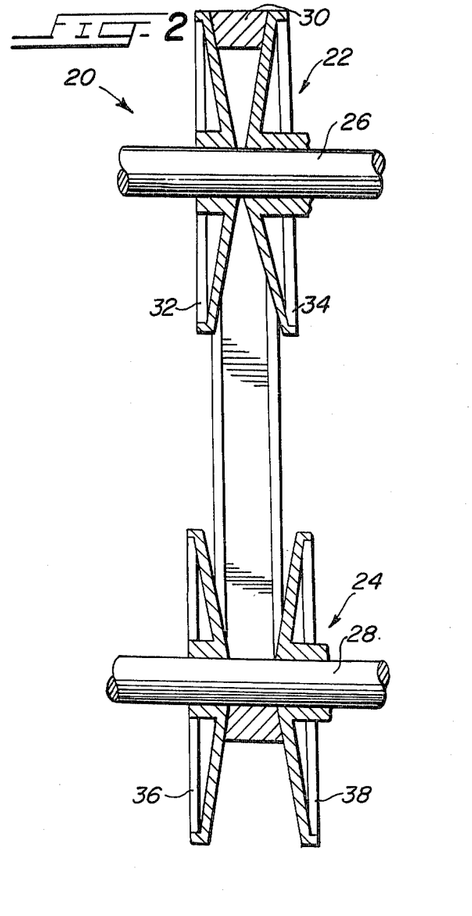
FIG. 2 is a schematic of a variable pulley drive in a high drive condition.

Attention is invited to the drawings and especially FIGS. 1 and 2 which show a variable pulley drive in two conditions, i.e., idle or slow speed condition (FIG. 1) and high speed condition (FIG. 2). The variable pulley drive designated at 20 comprises a driveR pulley 22 and a driveN pulley 24, each associated with a shaft 26, 28 respectively, and connected by a power transmission belt means 30. The belt means 30 can be a belt of an elastomer reinforced with tension members, a metal belt of connected sections, a combination metal-elastomer belt and/or the like.

The driveR pulley 22 comprises a pair of flanges 32, 34; one of which is drivingly connected to the shaft 26 and the other of which is arranged for limited longitudinal or axial movement with respect to the other and the shaft 26. In a like manner, the driveN pulley 24 comprises a pair of flanges 36, 38; one of which is drivingly connected to the shaft 28 and the other of which is arranged for limited longitudinal or axial movement with respect to the other end and the shaft 28.

As will be observed from FIG. 1 of the drawings, every revolution of the pulley 22 corresponds to a partial revolution of the pulley 24 when the pulley drive is operational and in idle or low speed condition. Similarly, in the FIG. 2 showing, every revolution of the pulley 22 corresponds to multiple revolutions of the pulley 24.

Figure 3:
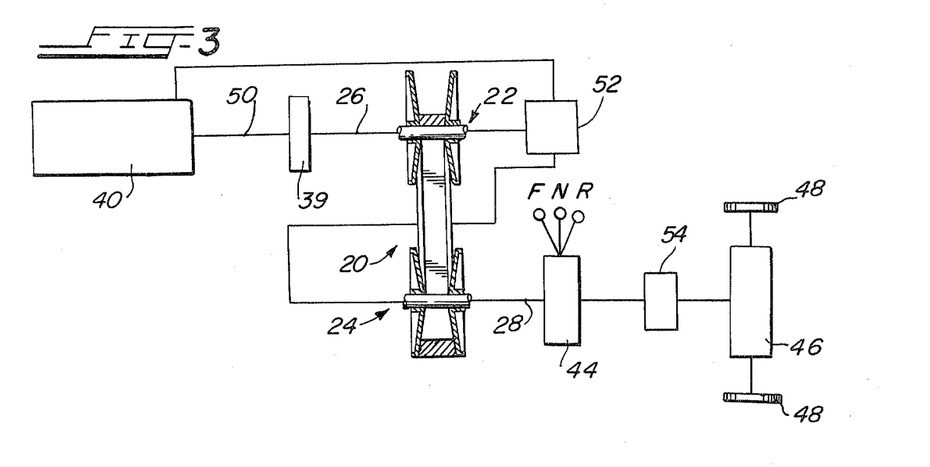
FIG. 3 is a schematic of a variable pulley drive according to this invention showing its relation to the engine and the driven means.

FIG. 3 illustrates the transmission of this invention and its relationship to other parts of a complete drive for an automobile. The transmission comprises the variable pulley drive 20, a prime mover or motor 40, and a vibration damper 39 of known construction located between the motor and the driveR pulley 22 to damp out torsional vibration from the motor 40, a speed-responsive friction starting device 42 which may be a clutch either manual or automatic, a brake band or disc packs on a reaction member and the like with means 44 to select neutral, forward and reverse drives, and a differential 46 through which the wheels 48 (either front or rear) of a vehicle are driven. A typical starting clutch is described in U.S. Pat. No. 3,263,782. As will be noted, the shaft 50 of the motor 40 is directly drivingly connected, through the vibration damper 39, to the shaft 26 of the driveR pulley 22; thus when the motor 40 is operational and its shaft 50 is rotating, the pulleys 22, 24 will also be rotating. The shaft 28 is connected to the starting device 42 and the direction selector which in turn is connected by a shaft 52 to the differential 46. To start the vehicle, the drive from the driveN pulleys must be transmitted to the wheels 48. This is accomplished by the speed-responsive friction starting device and the direction is selected by the means 44. In this drawing, the hydraulic control system is indicated by the numeral 52 while the final drive arrangement is noted at 54. The details of the system 52 and the drive arrangement 54 will follow.

Various means may be used to bias the movable flange of each pulley toward the fixed flange thereof to ensure belt contact; for example, springs, such as disc springs and coil springs. Hydraulic means may also be used with the mechanical biasing means. The flanges can be constructed as part of a hydraulic piston and cylinder arrangement and hydraulic control means can be provided to maintain or vary hydraulic pressures. It is common practice to construct a variable pulley with centrifugally responsive weights and the like in order to change drive ratios between the pulleys as the rotational speed of the driving shaft changes. Such devices may be used in the pulley drive of this invention.

When shifting between forward and reverse, the pulleys continuously rotate in the same direction as the prime mover, so that the inertia of these parts do not have to be synchronized.

Contrast the above with the more conventional arrangement with the clutch and selector mechanism positioned between the engine and the driveR pulley. When shifting between forward and reverse drive, the direction of rotating the pulleys must be reversed and the rotation of the pulleys must be stopped to effect the reversal of the drive.

Figure 4:
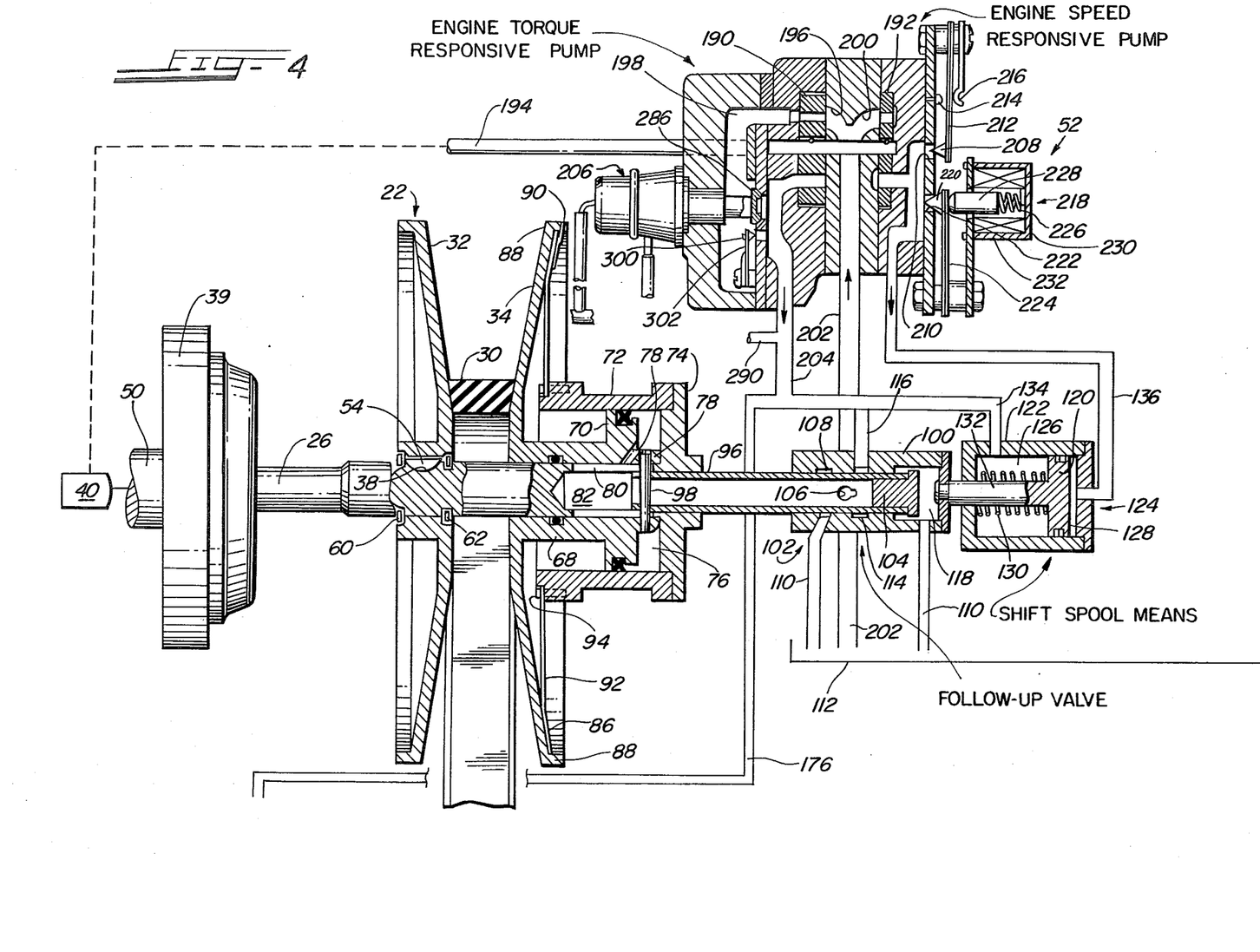
FIGS. 4 and 4A, when placed one above the other, illustrate the transmission and hydraulic control system of this invention.
Figure 4A:
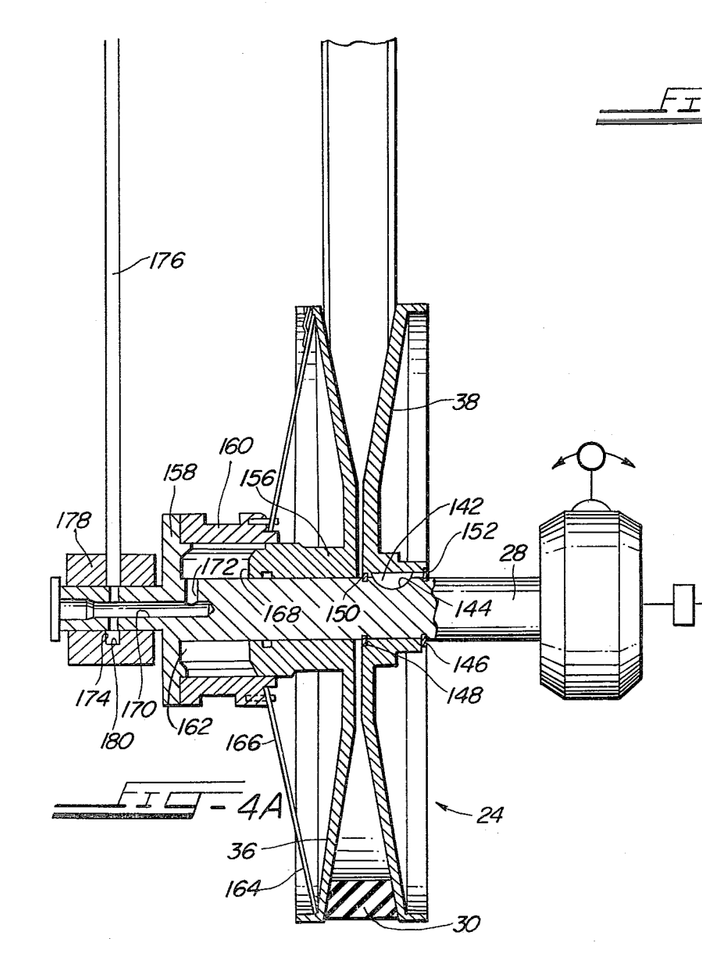

Looking at FIGS. 4 and 4A, there is illustrated the variable pulley transmission assembly which comprises the driveR pulley 22, a driveN pulley 24 and the hydraulic control system 52.

The driveR pulley 22 comprises a fixed flange 32 connected to the drive shaft 26 by a key received in a keyway 58 in the shaft 26, and snap rings 60, 62 received in grooves in the shaft 26. Because of the connection, the fixed flange 32 rotates with the shaft 26. The shaft 26 is connected to the drive shaft 50 of a prime mover, such as an internal combustion engine 40.

The vibration damper 39 is connected between the shafts 50 and 26.

The driveR pulley 22 further comprises the axially movable flange 34 having a hub portion 68 surrounding the shaft 26, which hub portion 68 has a cylindrical piston portion 70 received in a cylindrical member 72 closed by an end member or cover 74 to define a chamber 76 communicating via passages 78 and slots 80 in the shaft 26 with a central, open-ended bore 82 also in the shaft 26. The piston portion 70 has a terminal end 84 which abuts the cover 74 when the driveR flange is in low ratio position.

A disc spring 86 (see also FIG. 5) is drivingly connected adjacent the outer rim 88 of the movable flange 34 by spaced connecting means 90; the spring 86 has radially inwardly projecting fingers 92, some of which are connected by pins 94 and the like to a portion of the member 72.

Figure 8:
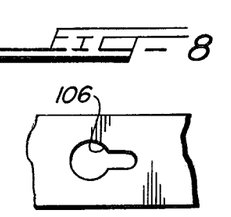
FIGS. 8 and 9 are enlarged illustrations of follow-up valve ports.
Figure 9:
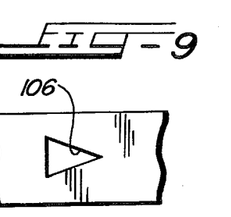

One end of a hollow tube 96 is received in the open-ended bore in the shaft 26 and is connected by a pin 98 to a portion of the hub 68 of the movable flange 34. The pin 98 passes through opposite slots 80 in the shaft 26, permitting the tube 96 to be axially movable. Because of the pin connection, the hollow tube 96 as well as the entire movable flange assembly is rotatable with the shaft 26. The opposite end of the hollow tube 96 is slidably received in the block or body 100 of a speed-responsive follow-up valve 102 and is closed by a flanged plug 104. One or more (usually a plurality) ports 106 communicate from the outside to the interior of the hollow tube 96. The ports 106 are elongated and of varying widths; as illustrated in FIGS. 8 and 9, a preferred configuration is pear-shaped (FIG. 8); the ports can also be essentially diamond-shaped (FIG. 9) or can be provided with a tapering defining wall, to ensure a gradual flow of fluid without a surge.

The block 100 has a first annular groove 108 connected to a drain conduit 110 opening to a sump 112, i.e., a supply of hydraulic fluid, such as oil, and a second annular groove 114 connected to a conduit 116. The flanged plug 104 is received in an enlarged cavity 118 in the block 100, the flanged plug 104 limiting the relative travel between the hollow tube 96 and the block 100. The cavity 118 is open to the sump 112 by the drain conduit 110.

A shift spool 120 is connected with the block 100 and is received in a stationary block 122 of a shift spool means 124. The spool 120 defines cavities 126 and 128 on the opposite sides thereof as shown. A coil spring 130 surrounds the connecting stem 132 of the spool 120, and the opposite ends of the block 122 are connected to conduits 134 and 136, respectively. The conduit 134 communicates with the cavity 126 and the conduit 136 communicates with the cavity 128.

The driveN pulley 24 comprises the fixed flange 38 connected to a driven or output shaft 28 by a key 142 received in a keyway 144 in the shaft 28 and snap rings 146, 148 received in grooves 150, 152, respectively, in the shaft 28, and an axially movable flange 36 having an axially extending hub 156 surrounding the shaft 28. The shaft 28 is provided with a radially extending flange 158 to which is connected a cylindrical member 160 surrounding the hub 156 and defining therewith a cavity 162. A disc spring 164 similar in construction to the spring 86 is drivingly connected at its periphery to the flange 36 and its fingers 166 engage the member 160. In order to provide sufficient loading of the flange 36, a double or triple parallel stacked spring may be used.

The terminal end 168 of the hub 156 is exposed to the cavity 162, so that the hub 156 acts as a piston when fluid is introduced into the cavity 162. To introduce fluid into the cavity 162, the shaft 28 is axially bored at 170 and transversely bored at 172 and 174. The bore 170 is plugged at its terminal end and a conduit 176 is connected to a non-rotatable delivery sleeve 178 surrounding the shaft 28. An annual groove 180 in the sleeve 178 provides communication between the conduit 176 and the bores 170, 172 and 174.

The flexible belt 30 connects the driveR pulley 22 and the driveN pulley 24. The belt 30 can be constructed of metal or an elastomer material reinforced with fiberglass or other cord tension members. The belt may be covered with a nylon or other cloth. Other belt constructions may be used, if desired. The flanges 36 and 38 of the driveN pulley 24 never abut one another because there must always be a load on the belt 30 which is provided by the spring-finger arrangement 164 and 166 and hydraulic pressure in the cavity 162.

The hydraulic control system 52 comprises a pair of positive displacement pumps 190, 192, preferably of the type known as internal-external gear pumps. One such known variety is sold under the tradename "Gerotor". Other types of positive displacement pumps may be substituted without departing from the spirit of the invention. The pumps 190 and 192 are connected to and driven by a common drive shaft 194 which in turn is driven from the engine 40. The pump 190 delivers hydraulic fluid under a pressure which is engine torque responsive and will be referred to as "P", while the pump 192 delivers a hydraulic fluid under a pressure which is engine speed responsive and will be referred to as "G". The pump 190 has suction or inlet ports 196 and 198 while the pump 192 has an inlet or suction port 200. The suction or inlet ports 196 and 200 of the pumps 190, 192, respectively, are connected by a conduit 202 to the sump 112. The outlet of the pump 190 is connected by a conduit 204 to the conduits 116, 134 and 176, previously mentioned. An engine manifold vacuum connected and torque responsive pressure control assembly 206 is associated with the conduit 204 and thus the pressure P is controlled by engine vacuum. As the vacuum increases, the assembly 206 varies the pressure at which hydraulic fluid is bypassed to the intake port 198.

The pump 192 delivers hydraulic fluid under a pressure related to the engine speed to the conduit 136, previously described. A metering pin 208 registering with a metering orifice 210 is in the conduit 136. The pin 208 is supported by a cantilevered bi-metallic arm 212. The travel of the arm 212 is limited by stops 214 and 216. A kickdown apparatus, generally identified as 218, is also associated with the conduit 136 and thus with the output of the pump 192. The kickdown apparatus 218 comprises a normally closed valve member 220 registering with an orifice 222 in the conduit 136.

The valve member 220 is supported by a cantilevered bi-metallic arm 224. The valve member 220 is resiliently urged toward the valve orifice 222 by a coil spring 226, and thus is normally closed until the core 228 of a solenoid 230 is energized by energizing the solenoid coil 232 by a kickdown switch (not shown) under the control of the driver vehicle.

Figure 10:
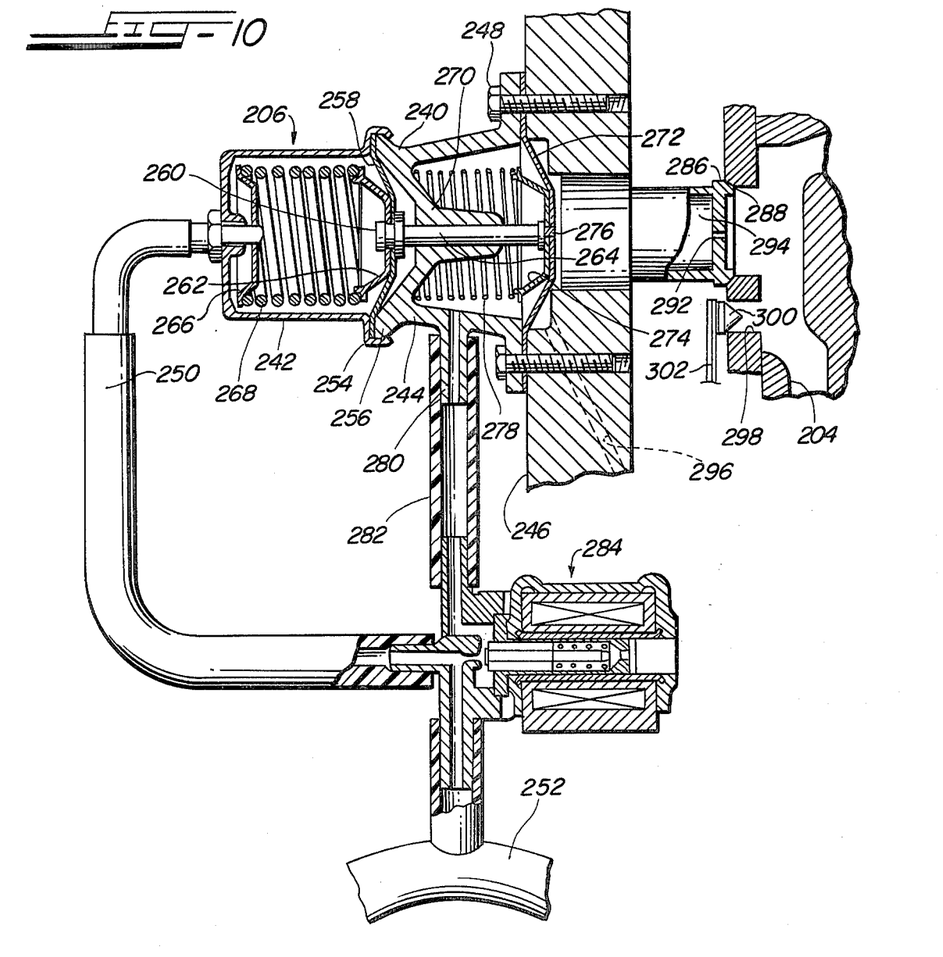
FIG. 10 is a schematic of a torque responsive pressure control assembly.

The pressure control assembly 206, see especially FIG. 10, comprises a multiple part housing 240 comprising a first cup-shaped part 242, a second part 244, and a closure part 246, the part 246 being a support casting. The parts 244 and 246 are bolted together by headed bolts 248 while the part 242 is connected to a hose or conduit 250. The conduit 250 is connected to its opposite end to the air intake manifold 252 of the engine 40.

Within the part 242 and retained in position by the flanges 254 and 256 is a diaphragm 258 connected by a rivet 260 at its center to a cup-shaped spring retainer 262. The rivet 260 bears against a valve operating rod 264. A second spaced spring retainer 266 is connected at the opposite end of the part 242 and a coil spring 268 positioned between the retainers 262 and 266. The spring 268 urges the diaphragm 258 and the rivet 260 against the rod 264. The valve operating rod 264 is slidably received in an inwardly extending neck 270 of the part 244.

A second diaphragm 272 is fixedly positioned between the parts 244 and 246 and is connected to a spring retainer 274 by a rivet 276. The rivet 276 bears against the rod 264. A coil spring 278 is positioned between the retainer 274 and the part 244. The interior of the part 244 is provided with a tube fitting 280 to which is connected a hose or conduit 282. The hose or conduit 282 is connected to a solenoid operated valve 284 associated with the forward-reverse shift mechanism 44.

Figure 6:
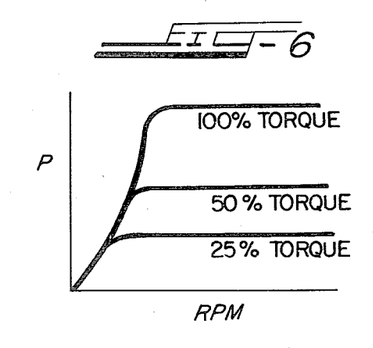
FIG. 6 is a curve of the output of one of the pumps of the hydraulic control system plotted against engine RPM.
Figure 14:
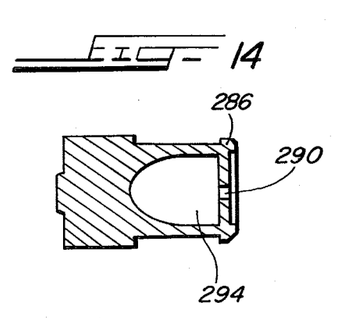
FIG. 14 is a detail of a valve plunger in the pressure control assembly.

A valve plunger 286 which seats on a valve seat 288 is associated with the assembly 206 and controls the pressure in the output or outlet conduit 204 from the pump 190, which conduit 204 also connects with a conduit 290 (see FIG. 4), to a starting clutch engaging servo (not shown) as is known in the art. The valve plunger 286 is provided with an orifice 292 and a cross-passage 294 into which the orifice 292 opens (see detail FIG. 14). The rivet 276 bears against the valve plunger 286, and thus the plunger 286 is always urged toward the seat 288 by the spring 278 (the plunger acting as a poppet-type relief valve under certain conditions), except when the forward and reverse mechanism is energizing the solenoid 284 admitting vacuum into the member 244, thereby overcoming the load on the spring 278. (While this indicates a hydraulic clutch, other types of clutches may be used within the scope of the invention). The part 246 has a vent 296 to vent one side of the diaphragm 272. In the conduit 204 (see also FIG. 4) is also an orifice 298 and a metering pin 300 controlled by a temperature-responsive bi-metallic arm 302. One side of the metering pin 300 and the valve 286 are in the port 198 leading to the input of the pump 190. The combination of the orifice 292 and the orifice 298 generates the initial rise in the P curve of FIG. 6, which may be used to control a hydraulically controlled starting clutch as in the prior art.

Figure 5:
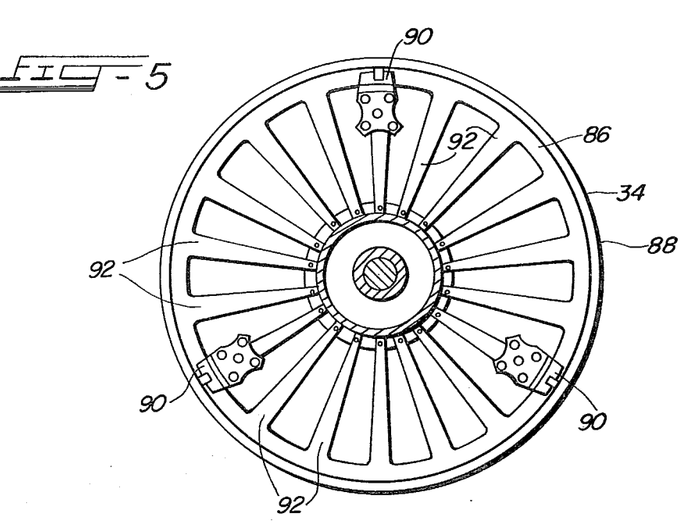
FIG. 5 is a plan view of a disc spring-finger assembly of this invention illustrating its attachment to other parts of the transmission.
Figure 11:
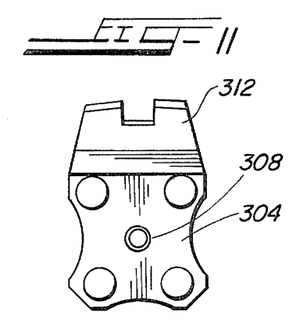
FIGS. 11, 12 and 13 are details of the driving connection of the disc spring-finger assembly and a pulley.
Figure 12:
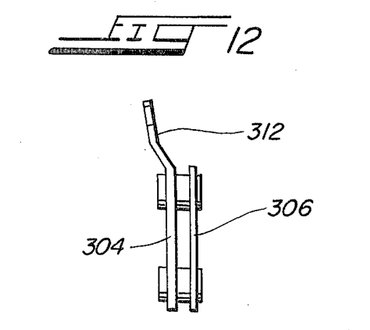
Figure 13:
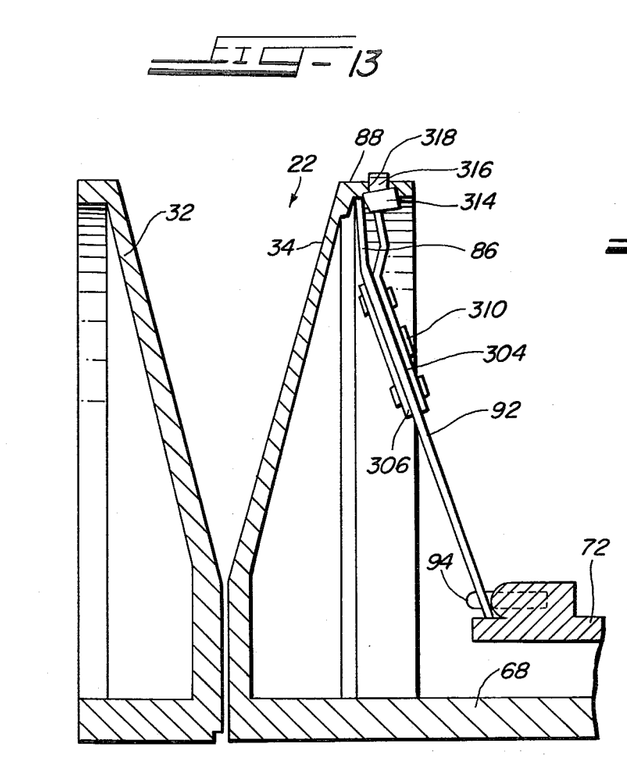

FIG. 5 illustrates the spring 86 for the driveR pulley 22 with its radially inwardly directed fingers 92. The spring 86 is drivingly connected at spaced locations to the rim 88 of the pulley flange 34 by connecting means 90. The means 90 is also illustrated in FIGS. 11, 12 and 13 and each comprises a front member 304 spaced from a rear member 306, the members being suitably spaced and connected together.

The front member 304 has a threaded opening 308 to receive a set screw 310 and also an extension 312 which engages a member 314 having a projection 316 passing through an opening 318 in the rim 88. To avoid drilling holes in the fingers 92, the means 304 is slipped over a finger, moved outwardly to the position shown and the set screw 310 is tightened to effectively connect the disc spring 80 to the rim 88.

The disc spring 164 for the driveN pulley 24 with fingers 166 is essentially the same construction as the spring 86 and is connected in a similar fashion to the flange 36; however, because it must exert a load on the flange 36 and thus the belt 30 in excess of that provided by the driveR pulley 22, the spring 164 may be stacked; for example, it may be constructed with a plurality of disc springs, each having inwardly directed fingers.

As illustrated in the drawings but not specifically described are suitable O-ring seals. These are provided where necessary and desirable.

Figure 15:
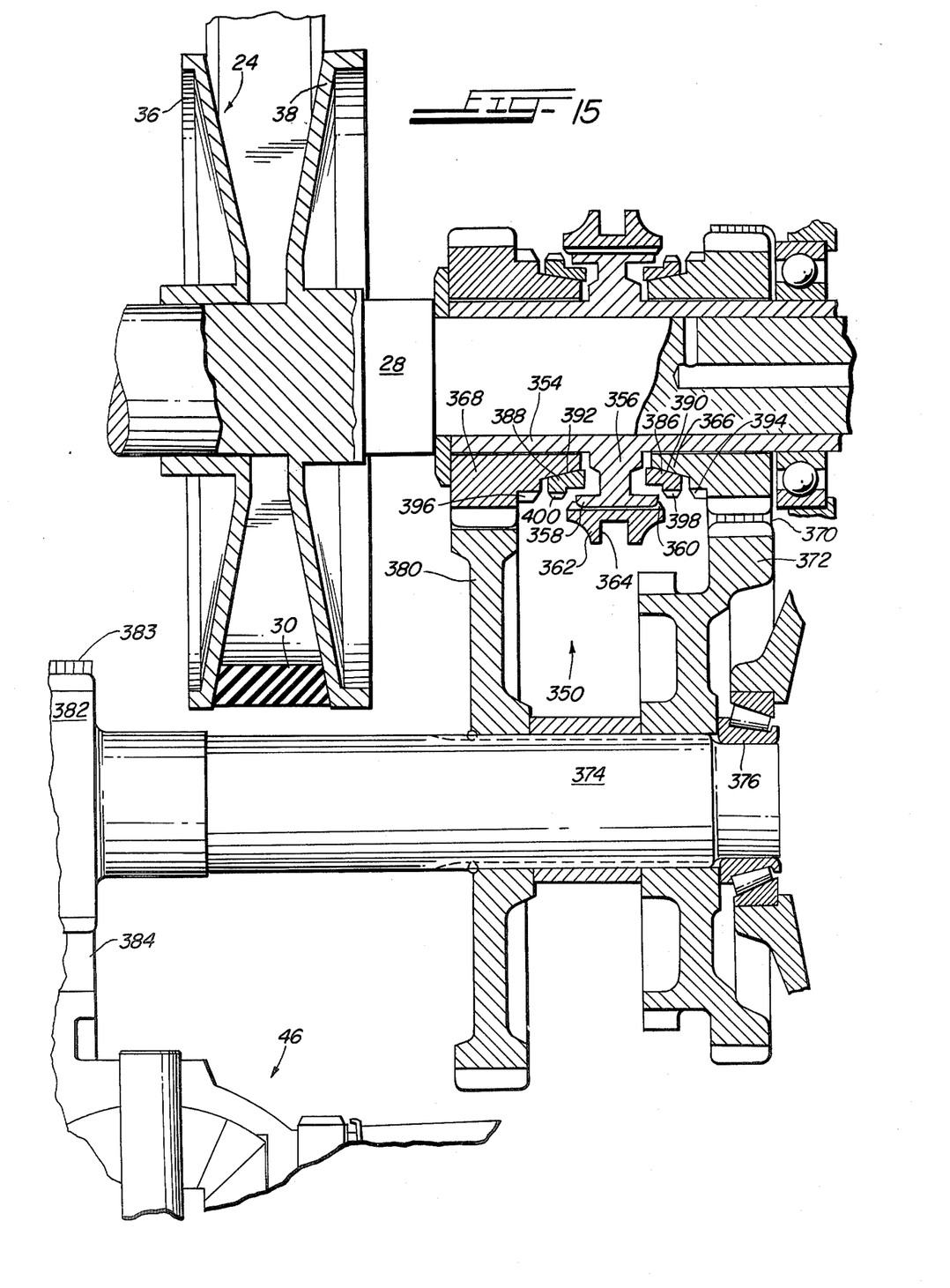
FIGS. 15 and 16 are illustrations of alternative forms of final drive arrangements.
Figure 16:
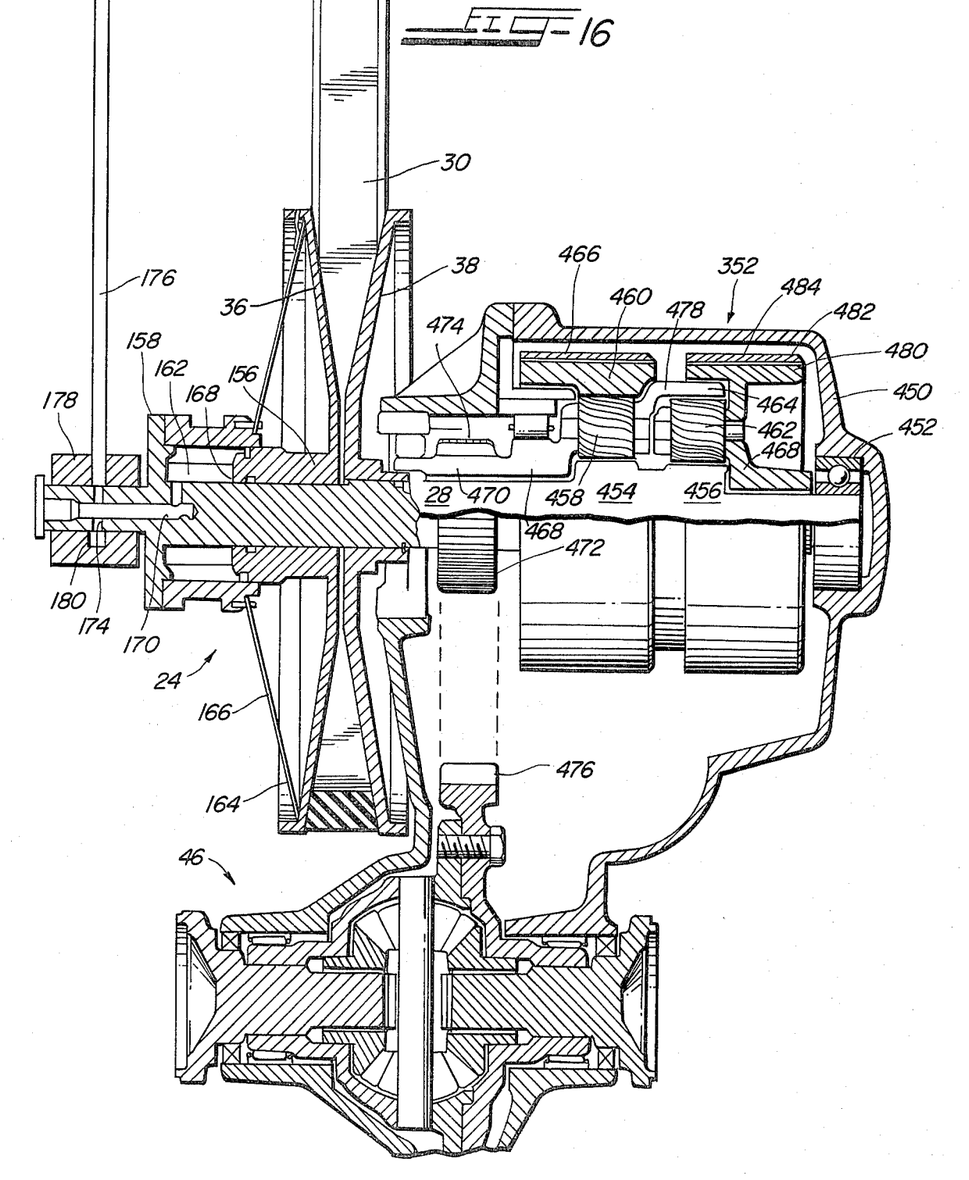

The final drive arrangements can be as illustrated in FIGS. 15 and 16; FIG. 15 illustrating the use of a synchronizer 350 and FIG. 16 illustrating the use of a planetary gear set 352. The drive between the synchronizer and the planetary gear set and the differential can be with gear trains or chains or combinations of gear trains and chains and the like.

Looking at FIG. 15, there is illustrated the synchronizer 350. The synchronizer 350 comprises a shaft sleeve 354 connected to the starting clutch 42, the sleeve 354 surrounding and being connected to the shaft 28. The sleeve 354 is provided with a central hub 356. The central hub 356 is formed with axially oriented teeth 358 engaging internal teeth 360 of an axially shiftable clutch sleeve 362. A circular groove 364 in the clutch sleeve 362 receives a shift fork (not shown) to axially shift the clutch sleeve 362. Surrounding the shaft sleeve 354 is a reverse gear 366 and a forward gear 368. The reverse gear 366 is connected by a chain 370 to a gear 372 fixed to a stub shaft 374 suitably supported by spaced bearings 376, 378, while the forward gear 368 meshes with a gear 380 connected to the stub shaft 374. The stub shaft 374 has a gear 382 connected by a chain 383 to a gear 384 to drive the differential 46.

The drive between the gears 366 and 372 can be by an intermediate gear and the gears 382 and 384 can be constructed to mesh with one another if desired.

Synchronizer rings 386 and 388 are provided which frictionally engage areas 390 and 392 of the respective gears 366 and 368. The gears 366 and 368 have clutch teeth 394 and 396, respectively, adapted to be engaged by the teeth of the clutch sleeve 362 to provide a positive driving connection between the hub 356 and gear 366 or gear 368. Synchronizer rings 386 and 388 have gear teeth 398 and 400 thereon which are functional in the synchronizing operations as known in the art.

When forward motion is desired, the clutch sleeve 362 is moved by the shift fork, so that its teeth 360 engage the teeth 400 of the synchronizer ring 388 and the teeth 396 of the gear 368, thus providing a connection between the forward gear 368 and the shaft 28.

When reverse motion is desired, the clutch sleeve 362 is moved by the shift fork, so that its teeth 360 engage the teeth 398 of the synchronizer ring 386 and the teeth 394 of the gear 366, thus providing a connection between the reverse gear 366 and the shaft 28.

Looking now at FIG. 16, planetary gear set 352 comprises a housing 450 of multiple part construction which at one end supports the shaft 28 in a bearing 452. The shaft 28 is formed or provided with a pair of spaced sun gears 454 and 456, the sun gear 454 forming with planet gears 458 and a ring gear 460, a forward reduction drive, and the sun gear 456 forming with planet gears 462 and a ring gear 464, a reverse reduction drive. The outer perimeter of the ring gear 460 receives a brake band 466 operated by the forward-reverse shift mechanism which has been omitted from FIG. 16 for the sake of clarity. When the band 466 engages the ring gear 460, rotation is transmitted to an annular support 468 for the planet gears 458. A forwardly extending sleeve-like portion 470 of the support 468 surrounds the shaft 28 and is relatively rotatable therearound. The sleeve 470 is formed or provided with a sprocket 472 which meshes with a drive chain 474. The chain 474 also meshes with a sprocket 476 in the differential 46. A rearwardly extending extension 478 of the support 468 forms the ring gear 464. A support 480 for the planet gear 462 has an annular surface 482 to be engaged by a reverse brake band 484. The support 480 also has a sleeve portion 486 surrounding the shaft 28 and relatively rotatable therearound. When the reverse band is energized, the planet gears 462 are held stationary, so that the ring gear 464, the planet gears 458 and the sleeve 470 rotate in a direction reverse to that previously described. The sleeve and sprocket 470 and 472 rotate in the opposite direction than previously described so that the differential is also reversely driven.

OPERATION

With the engine 40 idling, the driveR pulley 22 will be in the FIG. 1 relationship and rotating. The driveN pulley 24 will also be rotating, as will the shaft 28.

The pump 190 will be operating, but due to the orifices 292 and 298 bypassing fluid to the intake ports 196 and 198, the pressure will be at a very low value. (If this pressure is used in a hydraulically controlled starting clutch, such as in U.S. Pat. No. 3,263,782, the pressure will be insufficient to overcome the retractor springs in the clutch which maintain the clutch in the release position). The pump 192 will also be operating, but due to the fluid bypassing orifices 210 and 222, this pressure will also be at a very low value in the passage 136 and will be unable to overcome the retractive load of the spring 130 in the shift spool 124.

Therefore, the shift spool piston 120 and the follow-up valve body 100 will be at the fully retracted position (to the right as shown in the drawings) which opens the passages 106 directly to the sump 112 via the groove 108 and the passage 110, thus maintaining zero pressure in the cavity 76 and on the driveR pulley piston 70. Because of its hydraulic and mechanical connections, the follow-up valve 102 is both speed and torque responsive. At this time, the piston surface 84 abuts the closure 74 to provide a reaction for the belt loading forces developed at the driveN pulley 22 (as before stated, a load is always maintained on the belt 30 by the driveN pulley 22).

Figure 7:
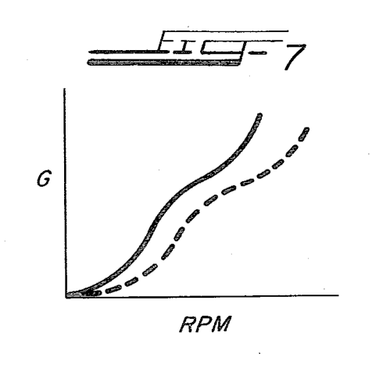
FIG. 7 is a family of curves of the output of the other of the pumps of the hydraulic control system plotted against engine RPM.

To start, the throttle of the engine (not shown) is opened and the engine RPM increases. The pump 190 delivers fluid pressure P in the manner indicated along the left portion of the curve (FIG. 6) which activates the automatic starting device 42. When the direction of movement of the vehicle is selected by the shift lever, the shaft 28 is connected to the drive shaft 26 and to the final drive assembly 54. The vehicle then starts to move. The pump 192 delivers even a lower pressure at this stage of operation and the pressure is still insufficient in the passage 136 to start moving the shift spool piston 120 to the left (as viewed in the drawings). Therefore, the driveR piston cavity 76 remains at zero pressure and connected to the sump 112 until some higher RPM is reached. The engine 40 and the shafts 26 and 28 turn together in the low drive ratio until the pressure G (see the rising portion of the pressure curve G, FIG. 7) becomes sufficient to initiate movement of the shift spool piston 120 and the follow-up valve body 100 to admit pressure into the driveR piston chamber 76.

Movement of the piston 120 and the pressure of the driveR piston chamber 76 on the piston 70 initiates movement of the driveR pulley flange 34 toward the flange 32. Movement of the flange 34 toward the flange 32 transmits additional tension to the belt 30 and forces the driveN flange 36 to move to the left, thereby changing the drive ratio between the pulleys. The resulting drive ratio will cause a feed-back signal (incremental change in engine RPM and G pressure which changes the force on the shift spool 120) which will correct for any drift in RPM during the speed ratio change at a given torque level as additional load is placed on the engine. This results in the maintenance of a constant engine speed for a given torque level until the ratio change has been completed to the end of the travel of the driveR pulley piston 70 at which time the driveR flange 34 butts against the driveR pulley flange 32.

Continued operation at this torque level results in a constant overdrive ratio and varying engine speeds related to the vehicle speed. It will be seen from the curves of FIGS. 6 and 7 that if this operation is at a 50% torque level, the opposing pressures (P) on the left-hand side of the shift spool piston 120 will be moderate and consequently only a moderate RPM will be required to attain sufficient pressure in the passage 136 to balance the pressure on the opposite side of the shift spool piston 120 which results in a moderate engine RPM and constant engine speed operation through the ratio change phase. With increasing torque, higher values of G and higher RPM of the engine will be required to induce the ratio change, such that in addition to the increased torque provided at higher throttle openings, increased RPM is also provided, so that considerable flexibility in the power output is available.

Turning now to the follow-up valve, the annular groove 108 is connected to the sump 112 by the conduit 110 and the groove 114 is connected to the pump 190. The land between groove 108 and groove 114 straddles the delivery ports 106 into the delivery tube 96. The amount of pressure in the passage 116 which actually is delivered to the cavity 76 and the driveR piston 70 is the result of minute shifts in the position of the follow-up valve block 100 in relation to the movement of the piston 120 of the shift spool 124. A slight movement of the driveR pulley piston 70 to the left which tends to increase the effective diameter of the driveR pulley 22 and the position of the belt 30, will tend to dump pressure into the sump 112 through the passage 110 and communicate the openings 106 with the groove 108 and thereby nullify this initial movement. Conversely, any tendency of the belt 30 to move down to a smaller driving diameter (with the flanges 32 and 34 moving apart) will tend to admit more line pressure to the driveR piston cavity 76 and correct for this motion, so that the result is that the pressure in cavity 76 is regulated at all times at some value less than the available pressure in the line 204, whereas the pressure on the driveN assembly piston 168 is always directly connected to this source of pressure, i.e., line 204, thus a load is always maintained on the belt 30 by the driveN pulley.

The configuration of the metering pin 208 (in conduit 136) and the deflection rate of the bi-metallic leaf spring 212 is developed to produce the desired shape of pressure G (pump 192) versus engine RPM. The action of the bi-metal spring 212 with changes in oil temperature compensates for the change in oil viscosity, such that the G curve remains substantially the same over the operating range of oil temperatures. At higher temperatures the bi-metal spring 212 reaches the stop 216 after which the effective free length of the cantilever arm is reduced, so that the amount of compensation at higher temperatures is reduced in accordance with the smaller changes in oil viscosity encountered at higher temperatures. In other words, the viscosity of the oil changes quite rapidly from room temperature to 140°, but from 140° to 200° it doesn't change nearly as much. On the opposite side of the bi-metal spring 212, the stop 214 shortens the effective cantilever length of the bi-metal spring 212 to cause the governor curve G to flex upward near the higher end of the engine operating speed range, so that a strong change in governor signal is provided near the top desired operating range of the engine to avoid the possibility of overspeeding the engine. The secondary cantilever spring 224 and metering pin 220 is normally held closed by the solenoid plunger 228 and its spring 226, but when maximum performance is desired, a kickdown switch (not shown) in the throttle linkage (not shown) closes at the full throttle position or just beyond the full throttle position to energize the solenoid windings 232 and retract the plunger 228, thereby allowing the cantilever/bi-metal spring 224 to provide an additional or auxiliary orifice and a maximum performance governor curve shown dotted in FIG. 7. The fluid then passes through both of the orifices 210, 222, and thereby increases the speed required at the pump 192 to reach the governor pressure which forces the belt 30 into the top overdrive ratio (FIG. 2). If at a given time speed and torque condition the follow-up valve body 100 and the position of the belt 30 is in a certain position, operation of the kickdown switch will reduce the pressure from a solid curve to the level shown by the dotted curve, thereby reducing the force on the right-hand side of the shift spool piston 120. The follow-up valve body will move to the right and relieve pressure in the chamber 76 causing the flange 34 of the driveR pulley to move to the right. The belt 30 then moves towards the bottom of the driveR pulley, changing the ratio of the drive toward low drive ratio. The spring 86 always provides a bias load on the flange of the driveR pulley 22 to squeeze the belt 30, but the bias load is insufficient by itself to overcome the tension of the belt produced by the driveN flange assembly 24.

Assuming the driver of the vehicle has been cruising at a certain speed at part throttle and wishes to accelerate by opening the throttle but not to the extent of going through the kickdown, instead of changing the pressure G at the pump 192, the increase throttle causes a decrease in vacuum in the pressure control valve 206. This permits more of the spring pressure to be applied to that valve, thereby increasing the pressure to a higher level in the conduit 204 and on the left-hand side of the shift spool piston 120 (in the cavity 126). This will cause the follow-up valve body 100 to move to the right and the ports 106 will communicate to some extent with the groove 108 and thus the conduit 110 and the sump 112.

Some of the pressure in the chamber 76 will be relieved causing a shift in the belt position towards the lower drive ratio position.

TECHNICAL ADVANTAGES

An important component of the inventive combination is a speed-responsive friction starting device, positioned to effect a driving connection between the driven pulley and the driven means. One such automatic clutch control arrangement is disclosed in the above-identified Patent No. 3,263,782. With the disclosed arrangement the input pulley is always driven at the engine speed, and both pulleys turn in the same direction. Thus pulley inertia is not a problem in the forward-reverse shift. By providing a speed-responsive friction starting device, the operational benefits of a lockup torque converter are obtained without the necessity for inserting a torque converter and a lockup clutch, but only the friction device or clutch of this invention.

While only particular embodiments of the invention have been described and illustrated, it is manifest that various alterations and modifications can be made therein. It is therefore the intention in the appended claims to cover all such modifications and alterations as may fall within the true spirit and scope of the invention.

I claim:

1. In a power transmission apparatus adapted to transmit rotary motion between an engine with an engine shaft and a driven means such as the driving wheels of a vehicle and the like and having a variable rotary pulley drive unit with a driver pulley and a driven pulley connected by a belt means, each pulley having a pair of flanges, at least one flange of which is axially movable with respect to the other flange to change the spacing between the flanges and thus the speed ratio between the pulleys, and means responsive at least to the speed of the engine shaft to change the spacing of the pulley flanges and thus the speed ratio, the improvement which comprises:
    means connecting said driver pulley directly to the engine shaft so that the pulleys are continuously rotated only in one direction when the motor is operating and its shaft is rotating, the continuous rotation of said pulleys when said engine is operating enchancing the shifting of the belt means on said pulley flanges when the speed ratio between the pulleys is changed;
    means comprising a speed-responsive friction starting device drivingly connecting said driven pulley and said driven means; and
    means to select the direction of rotation of said driven means.

2. A power transmission apparatus as recited in Claim 1, where said speed-responsive friction starting device comprises a clutch.

3. A power transmission apparatus as recited in Claim 2, where said means to select the direction of rotation of said driven means comprises a forward-reverse-neutral shifting device operatively associated with said starting device.

4. A power transmission apparatus as recited in Claim 3, where said drivingly connecting means further comprises a synchronizer means.

5. A power transmission apparatus as recited in Claim 3, where said drivingly connecting means further comprises a planetary gear set.

6. A power transmission apparatus adapted to be connected between a prime mover and a driven means, having a variable rotary pulley drive unit and a forward-reverse gear means, said pulley drive unit comprising a driver pulley and a driven pulley each having a pair of flanges axially movable with respect to one another to change the speed ratio between the pulleys, and a belt means connecting the driver and driven pulleys for transmitting power therebetween, the improvement comprising:

means connecting said driver pulley directly to said prime mover so as to be continuously rotated only in one direction by said prime mover during its operation;

control means operatively associated with said prime mover and said pulley drive unit and responsive to the operation of the prime mover for changing the speed ratio between the pulleys;

means connecting said driven pulley to said gear means;

means connecting said gear means to said driven means; and means to select forward, reverse and neutral drives through said gear means.

7. A power transmission apparatus as recited in Claim 6, and further comprising chain means connecting said gear means to said driven means.

8. A power transmission apparatus as recited in Claim 6, in which said gear means comprises at least one planetary gear set.

9. A power transmission apparatus as recited in Claim 6, in which said gear means comprises a synchronizer.

10. (Amended) In a power transmission apparatus having a drive pulley [,] and a driven pulley , *each pulley having a pair of tapered flanges, at least one of which is axially movable relative to the other to regulate the flange spacing and correspondingly to modify the speed ratio between the pulleys*, the drive pulley being driven by an engine and the pulleys being drivingly connected by a belt [and the like] with the spacing between the pulley flanges of each pulley being variable to provide a variable speed drive, and a hydraulic control system operatively associated with the pulleys to vary the spacing of the flanges and including a pump providing an engine torque responsive hydraulic fluid, the improvement comprising:

a follow-up valve in said hydraulic system having a movable block to control the flow of hydraulic fluid to a piston *connected to a flange of the drive pulley* and connected piston operator to control the spacing of the drive pulley flanges;

an opening in *said* [each] piston operator through which said hydraulic fluid flows;

said block being movable relative to said opening to control the amount of fluid to said piston;

said opening having an elongated shape with a leading portion being smaller than a trailing portion to ensure gradual flow of fluid to said piston and to reduce surges in said flow.

11. In a power transmission apparatus as recited in claim 10, in which said opening is pear-shaped.

12. In a power transmission apparatus as recited in claim 11, in which said opening is essentially diamond-shaped.

* * * * *

UNITED STATES PATENT OFFICE
CERTIFICATE OF CORRECTION

PATENT NO. : 4,241,618
DATED : December 30, 1980
INVENTOR(S) : RICHARD LEWIS SMIRL It is certified that error appears in the above-identified patent and that said Letters Patent are hereby corrected as shown below:

Column 12, line 63, after "6." cancel "A" and insert -- In a --.

Column 13, line 31, after "10." cancel "(Amended)".

lines 32, through "between the pulleys" in line 4, column 14, cancel the italicized phrasing -- each pulley having a pair of tapered flanges, ........between the pulleys, -- and substitute conventional print.

Column 14, line 6, cancel "(and the like)" and insert -- and the like --.

Column 14, lines 15 and 16, replace the italicized phrase -- connected to a flange of the drive pulley -- with conventional print.

Column 14, line 18, replace the italicized word "said" with conventional print.
            line 18, cancel "(each)" and insert -- each --.

*Signed and Sealed this*

*Nineteenth* Day of *May 1981*

[SEAL]

*Attest:*

RENE D. TEGTMEYER

*Attesting Officer*     *Acting Commissioner of Patents and Trademarks*